(12) United States Patent
Sommer et al.

(10) Patent No.: US 6,688,999 B2
(45) Date of Patent: Feb. 10, 2004

(54) METHOD AND DEVICE FOR CONTROLLING A DRIVE-LINE INCLUDING A CVT

(75) Inventors: Stefan Sommer, Saulgau (DE); Andreas Piepenbrink, Grünwald (DE); Steffen Braun, Langenargen (DE)

(73) Assignee: ZF Transmission Technologies, L.L.C., Batavia, OH (US)

( * ) Notice: Subject to any disclaimer, the term of this patent is extended or adjusted under 35 U.S.C. 154(b) by 7 days.

(21) Appl. No.: 10/096,363

(22) Filed: Mar. 12, 2002

(65) Prior Publication Data

US 2002/0173390 A1 Nov. 21, 2002

(30) Foreign Application Priority Data

Mar. 13, 2001 (DE) .......................................... 101 11 830

(51) Int. Cl.[7] .............................................. F16H 59/00
(52) U.S. Cl. .............................................. 474/18; 474/8
(58) Field of Search ................................ 474/8, 18, 24; 192/3.58, 51, 56.3; 477/39, 906

(56) References Cited

U.S. PATENT DOCUMENTS

| | | | | |
|---|---|---|---|---|
| 4,628,772 A | * | 12/1986 | Nishikawa et al. | 477/125 |
| 4,733,582 A | * | 3/1988 | Eggert et al. | 477/38 |
| 5,193,417 A | * | 3/1993 | Niiyama et al. | 477/119 |
| 5,449,331 A | * | 9/1995 | Maciejewski et al. | 477/175 |
| 5,937,729 A | * | 8/1999 | Spiess et al. | 91/517 |
| 5,961,408 A | | 10/1999 | König et al. | 474/18 |
| 5,964,680 A | * | 10/1999 | Salecker et al. | 477/74 |
| 5,971,876 A | * | 10/1999 | Spiess et al. | 474/28 |
| 6,077,187 A | * | 6/2000 | Suzuki et al. | 477/48 |
| 6,350,215 B1 | * | 2/2002 | Gierling | 475/159 |

FOREIGN PATENT DOCUMENTS

| | | | | |
|---|---|---|---|---|
| DE | 44 42 469 A1 | 6/1995 | | B60K/41/22 |
| DE | 198 15 260 A1 | 10/1998 | | B60K/41/02 |
| DE | 199 20 378 A1 | 11/2000 | | F16D/25/062 |
| EP | 0 784 767 B1 | 10/1995 | | F16H/61/12 |

* cited by examiner

*Primary Examiner*—David A. Bucci
*Assistant Examiner*—Vicky A. Johnson
(74) *Attorney, Agent, or Firm*—Davis & Bujold, PLLC

(57) ABSTRACT

The invention describes a method and a device for controlling a drive train of a motor vehicle with a drive assembly and a continuously variable automatic transmission with a variable speed gear, wherein an electronic control unit for controlling at least the continuously variable automatic transmission and an emergency device are provided, with this unit being activated in the event of failure of the electronic control unit and a constant pressure/force ratio being established in the variable speed gear. Pursuant to the invention, in the event of failure of the electronic control unit the frictional connection between the drive assembly and the continuously variable automatic transmission is interrupted before the emergency driving mode is made available through the emergency device by re-establishing the frictional connection.

16 Claims, 5 Drawing Sheets

METHOD AND DEVICE FOR CONTROLLING A DRIVE-LINE INCLUDING A CVT

FIELD OF THE INVENTION

The invention relates to a method and a device for controlling a drive train of a motor vehicle with a drive assembly and a continuously variable automatic transmission.

BACKGROUND OF THE INVENTION

In modern motor vehicles familiar electronic control units, such as electronic transmission controls which can also be connected with electronic engine controls, are used for controlling the drive train.

Such electronic control units are also required for a continuously variable automatic transmission, which is also called a CVT (continuously variable transmission) automatic transmission, which contains a variable speed gear with a first taper disk set on a drive shaft as the primary disk set and with a second taper disk set on a driven shaft as the secondary disk set. Each taper disk set respectively consists of an axially fixed first disk and an axially displacable second disk which are described as a primary disk or as a secondary disk, depending on whether they are assigned to the primary disk set or secondary disk set. In order to be able to adjust the primary disk or the secondary disk, they are fed a pressurizing medium wherein the pressure that is respectively applied to the setting spaces of the primary disk and the secondary disk is determined, via an electronic control unit and electromagnetic positioning elements and hydraulic valves that are selected by this control unit.

In case of a malfunction of the electronic control unit, emergency programs are generally provided which are designed so as to be able to operate a vehicle in an emergency operating mode.

From EP 0 784 767 B1, we know of an emergency device for controlling a CVT wherein an electronic control device determines the pressure level of the particularly dynamically unbalanced setting spaces of the primary disk and the secondary disk via the electromagnetic positioning elements and the hydraulic valves. The emergency device, which is provided in the event of failure of the electronic control device, contains two pressure control valves, two pressure reduction valves and at least one emergency valve, wherein a primary valve and a secondary valve adjust a constant static pressure ratio and/or force ratio between the primary disk and the secondary disk with a constant static secondary pressure level.

The amount of these static force ratios and of the dynamic forces that are applied to the dynamically pressure non-compensated disks allows a determination as to how great the gear ratio change of the CVT is when transitioning from normal operation to the emergency operating mode. The emergency operating mode is described as a state of the CVT in which the governing speed and applied pressure control of the secondary disk are interrupted.

The problem with these hydraulic emergency programs lies in the control of the unavoidable hydraulic valve tolerances because a shift in the constant pressure ratio directly affects the gear ratio setting range.

From experiments we know that pressure tolerances of 5 bar can be present on the variable speed gear disks. The appropriate gear ratios in the emergency program are dispersed accordingly. For example, in the case of a tolerance setting with minimal pressure on the primary disk and maximum pressure on the secondary disk within the tolerance range, the gear ratio can be too far towards the smallest possible gear ratio (LOW) with a value considerably above 1, which drastically limits the permissible maximum speed during the emergency operating mode and wherein an abrupt change from a normal mode, at high speed, into the emergency operating mode can lead to a so-called over speeding of the driving motor, transmission damage and possibly a destruction of the transmission.

When considering a tolerance setting where a maximum pressure exists on the primary disk and a minimum pressure on the secondary disk within the tolerance range, a mean gear ratio level arises with a gear ratio in the direction of the largest possible gear ratio (overdrive, OD). A transition from the normal driving mode with a high vehicle speed into an emergency operating mode at this gear ratio level is not critical for the intactness of the transmission, however, the start-up power, despite excessive converted torque, may possibly be insufficient for starting to move the vehicle on slight inclinations after a standstill or a shut-down motor.

In order to prevent the transmission from being damaged when activating the emergency program due to too large a gear ratio or too small a gear ratio being set for starting to move the vehicle, valves can be used in which pressure is supplied in proportion to RPM or speed, e.g. through pitot tubes, however, this is associated with a considerably increased design complexity. The possible use of an engine speed program, which supplies information about the vehicle speed to the hydraulic emergency program, also proves problematic because such an engine speed program is no longer available when the electronic control unit, which adjusts the pressure ratio on the variable speed gear, fails and thus must be compensated for via a separate electronic control unit at additional costs.

SUMMARY OF THE INVENTION

The task of the present invention is to make a method and a device for controlling a drive train of a motor vehicle with an available continuously variable automatic transmission with which, in the event of a failure of at least one control unit that selects the continuously variable automatic transmission and a transition from normal operation to an emergency operating mode, a gear ratio is set in the variable speed gear of the continuously variable automatic transmission which avoids damage to the transmission and, at the same time, makes sufficient start-up power available.

To resolve this, the invention provides for the fact that in the event of failure of the electronic control unit, the frictional connection between the drive assembly and the continuously variable automatic transmission is interrupted before an emergency operating mode is made available through an emergency device by re-establishing the frictional connection.

As the device for controlling such a drive train with a continuously variable automatic transmission, which contains a variable speed gear, and an emergency valve device, which is activated upon failure of the electronic control unit, is provided in the pressure supply line to a clutch arrangement of a forward/reverse driving unit of the continuously variable automatic transmission, wherein the valve is switched into a position that separates the pressurized medium flow to the clutch arrangement, in the event of failure of the electronic control unit, so as to interrupt the frictional connection between the drive assembly and the continuously variable automatic transmission through an emergency program pressure.

The invented method and/or the invented device, respectively, allow the frictional connection in the drive train to be interrupted upon activation of the hydraulic emergency program, wherein beneficially independent from the tolerance setting of the disk valves of the variable speed gear, even an over speed of the driving motor is prevented when the electronic control unit fails at extremely high vehicle speed and the emergency device is activated.

On the other hand, the invented method and the invented device allow the frictional connection to be established for a gear ratio which is within the range of the smallest possible gear ratio (LOW) when re-starting the motor during the emergency operating mode, i.e., in a state of the continuously variable automatic transmission in which no governing speed and no applied pressure control occurs through the variable speed gear, so that sufficient start-up power is available and a maximum vehicle speed of well over 100 km/h is ensured, thus making a relatively large operating range available.

BRIEF DESCRIPTION OF THE INVENTION

The invention will now be described, by way of example, with reference to the accompanying drawings in which.

Figure 3:
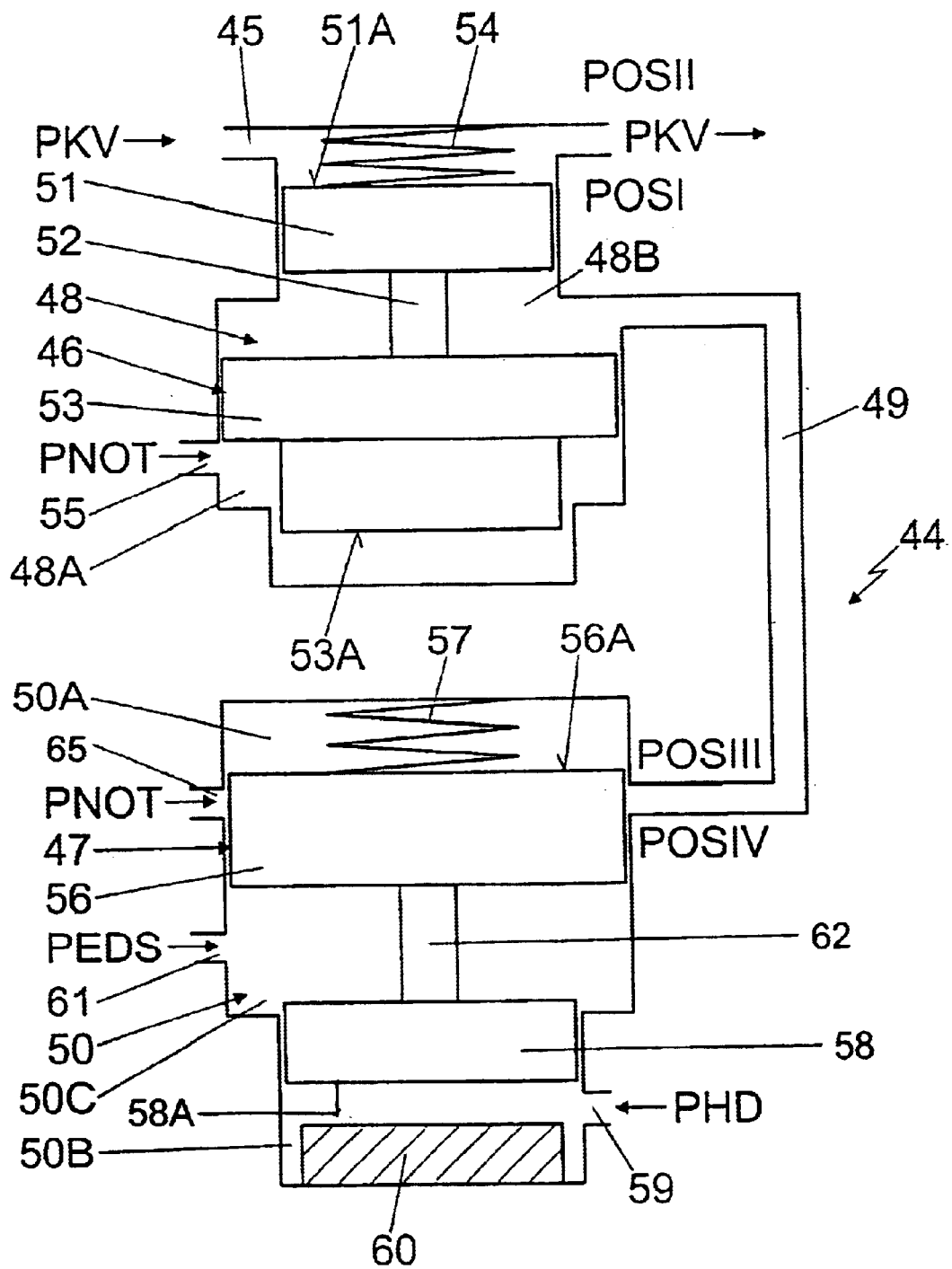
FIG. 3 is a rough diagrammatic longitudinal section through a valve of a device, during normal driving operation, for controlling the continuously variable automatic transmission pursuant to FIG. 1.
Figure 4:
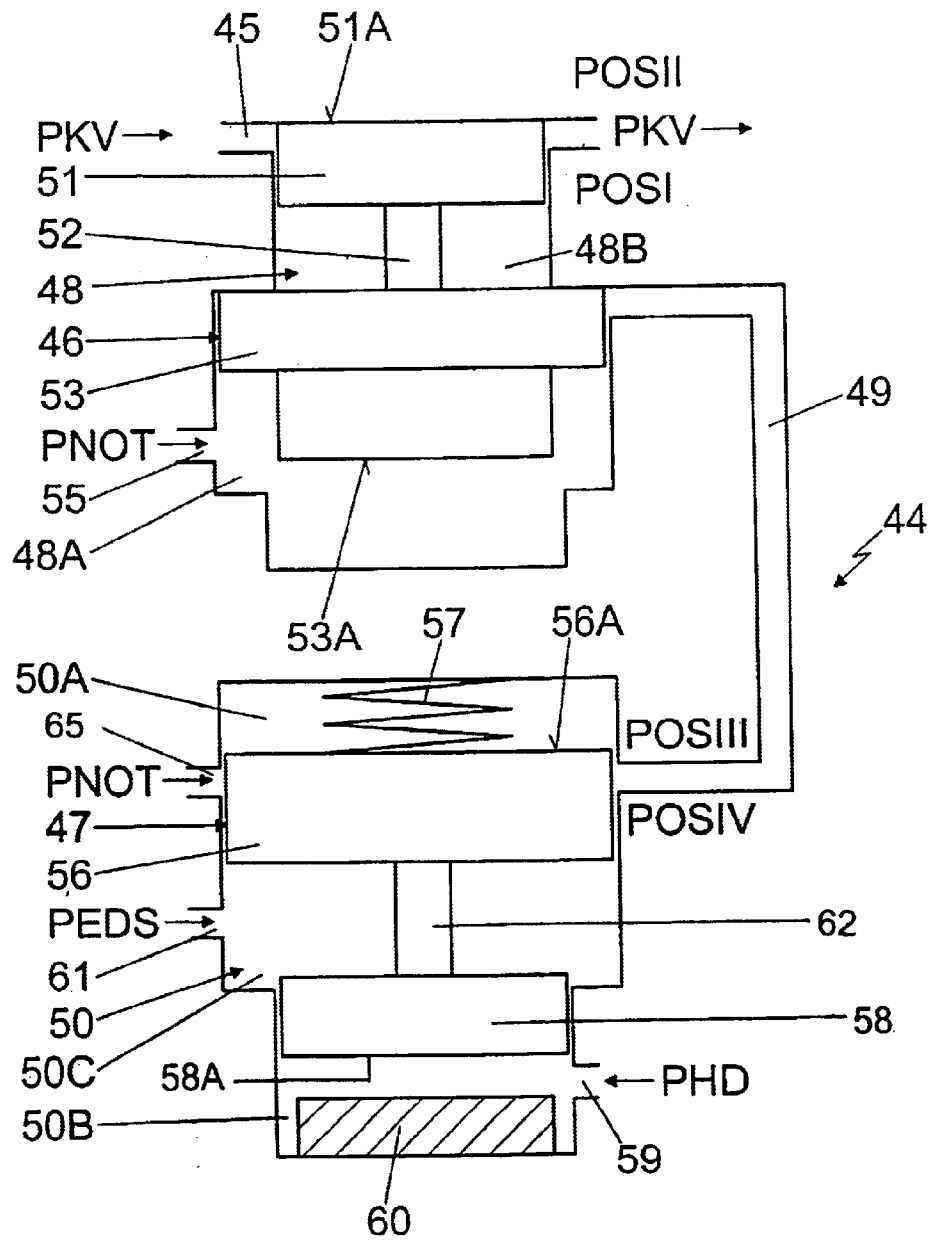
Figure 5:
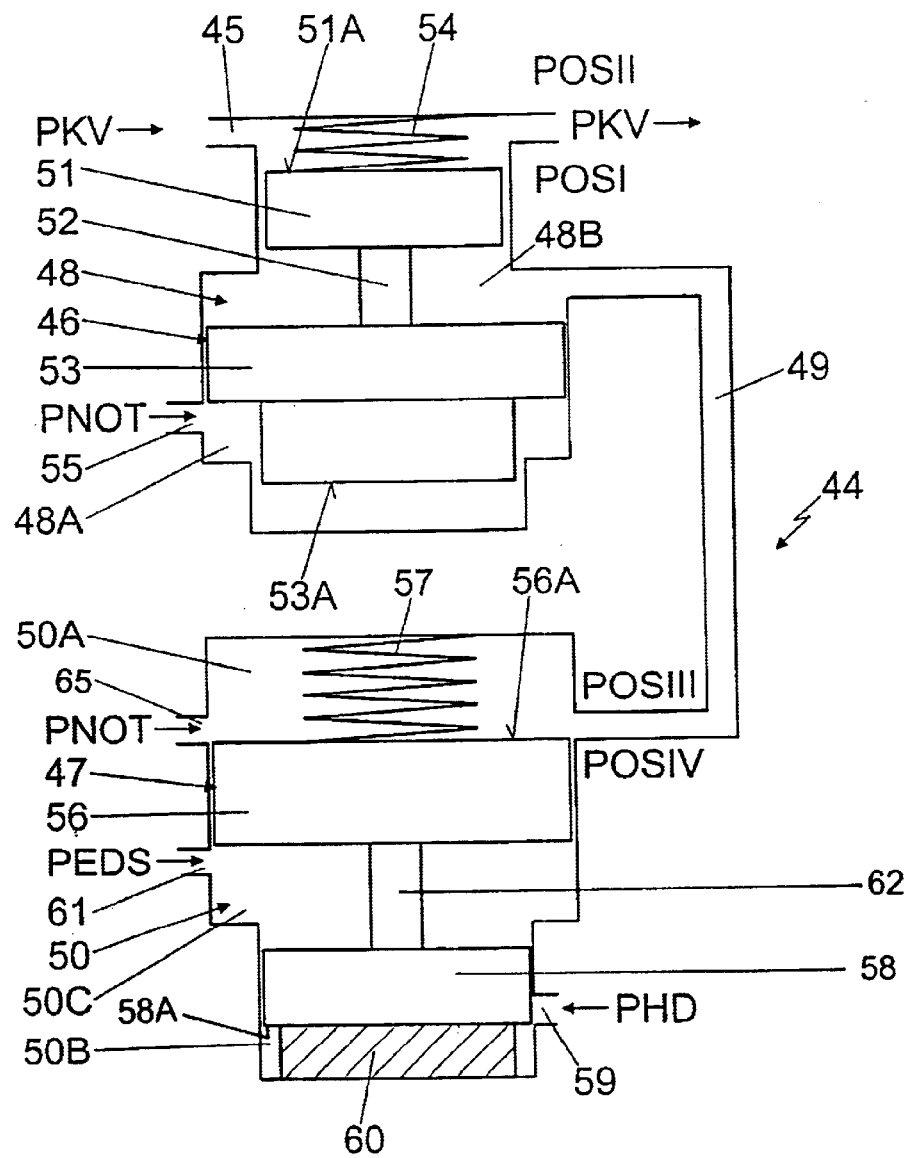

FIG. 4 is a diagrammatic longitudinal section through the valve pursuant to FIG. 3 in a state in which this valve stops a frictional connection in the drive train between the drive assembly and the continuously variable automatic transmission during the emergency operating mode pursuant to FIG. 1; and FIG. 5 is a diagrammatic longitudinal section through the valve, pursuant to FIG. 3 and FIG. 4, in a state in which this valve re-establishes the frictional connection in the drive train pursuant to FIG. 1 again when starting to move the vehicle after re-starting the engine during the emergency operating mode.

DETAILED DESCRIPTION OF THE INVENTION

Figure 1:
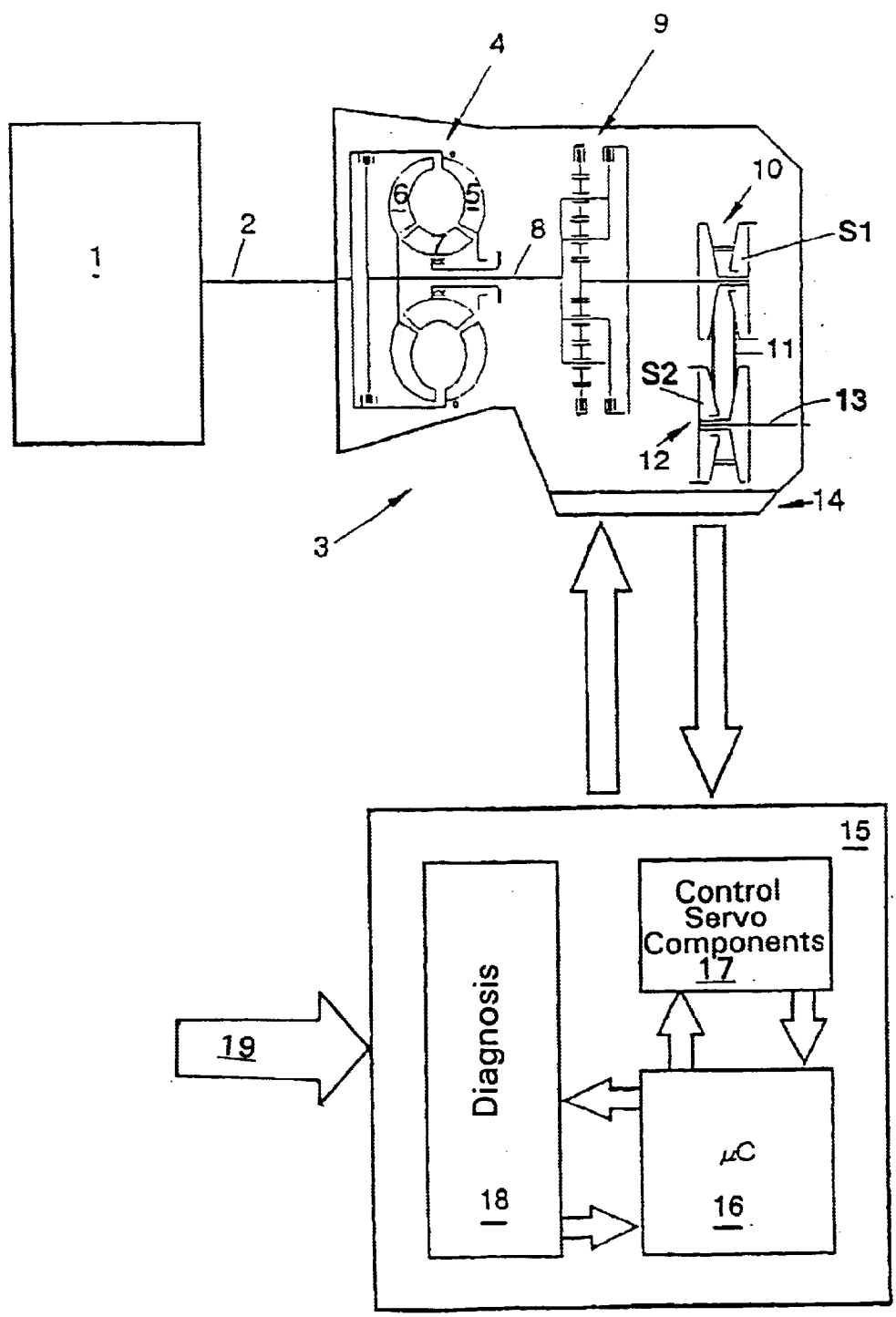
FIG. 1 is a drastically simplified block diagram of a drive train with an electronically controlled continuously variable automatic transmission.

FIG. 1 depicts a rough diagram of a drive train of a motor vehicle with a drive assembly 1 which, in the present example, is designed as an internal combustion engine which is connected via a drive shaft 2 to continuously variable automatic transmission 3 which is a belt-wrap transmission or CVT. This continuously variable automatic transmission contains a hydrodynamic torque converter 4 which, as usual, consists of a pump wheel 5, a turbine wheel 6, a stator 7 and a converter bridging clutch, wherein the turbine wheel 6 and/or the converter bridging clutch are connected with a transmission input shaft 8. The transmission input shaft 8 drives a forward/reverse driving unit 9, which contains clutches for forward and reverse driving and transmits the speed of the transmission input shaft 8 directly to a variable speed gear V with a drive-side, primary taper disk set 10 and a driven-side, secondary taper disk set 12. With the help of a belt-wrap device 11 in the form of a chain or a sliding chain belt, the force is transmitted from the primary taper disk set 10 to the secondary taper disk set 12. Each taper disk set consists of an axially fixed and an axially displacable disk. The axially displacable taper disk of the primary taper disk set is called the primary disk S1 and the axially displacable taper disk of the secondary taper disk set is referred to as the secondary disk S2. By simultaneously varying the axially displacable disks S1, S2, the radius of the belt-wrap device 11 and thus the gear ratio of the variable speed gear V changes from the smallest possible, high starting gear ratio LOW to the largest possible, low gear ratio OVERDRIVE. The secondary taper disk set 12 is connected with the drive shafts of the vehicle wheels through a driven shaft 13.

The continuously variable automatic transmission 3 is controlled, via electromagnetic positioning elements and hydraulic valves, by an electronic control unit 15 which in the present example, represents an electronic control device that can be connected with an electronic motor control device. The clutches and brakes are supplied with pressure, in a controlled manner, via these positioning elements, which are not shown in more detail in FIG. 1. FIG. 1 also shows, as part of the electronic control device 15, a diagrammatic view of a micro-controller 16, a functional block for controlling the positioning elements 17 and a diagnosis functional block 18. The electronic control device 15 communicates with a control device 14, symbolically indicated in FIG. 1, wherein it determines an operating point in dependency upon input variables 19, e.g., which can be a signal of a load position of the internal combustion engine 1, a speed signal of the transmission input shaft, a speed signal of the driven shaft, or the temperature of the pressurizing medium, and adjusts the appropriate speed value of the transmission input shaft or the gear ratio of the automatic transmission 3.

When the diagnosis functional block 18, which examines the input variables 19 for plausibility, detects a serious error, generally the functional block 17 for control of the positioning elements is deactivated and an emergency operating mode is initiated in which no governing speed and no applied pressure control of the secondary disk S2 occurs.

This embodiment of a drive train, with internal combustion engine 1 and a continuously variable automatic transmission 3 with a variable speed gear V shown in FIG. 1, is known as such and represents an example of where the invented method and the invented device can be beneficially applied.

Figure 2:
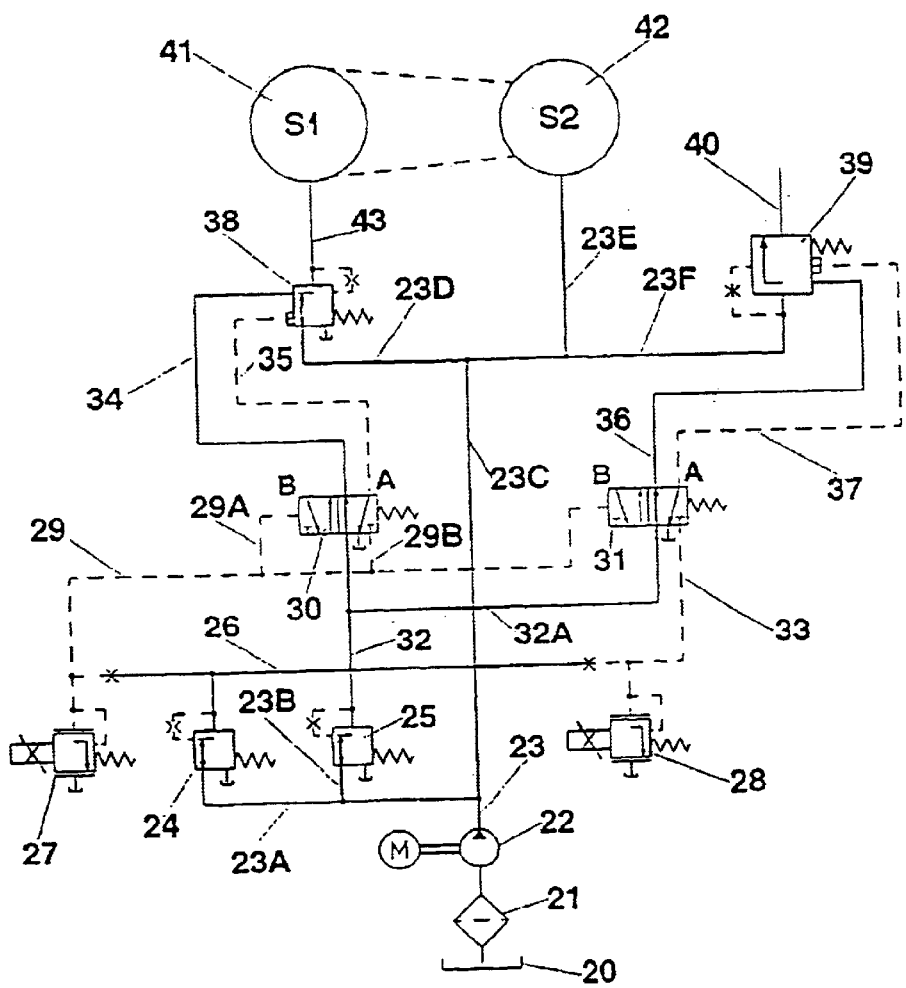
FIG. 2 is a simplified hydraulic diagram of an emergency device for the continuously variable automatic transmission pursuant to FIG. 1.

An emergency device, which is activated in the event of failure of the electronic control unit and/or the electronic control device 15, suggests itself as the emergency device, which is also known as such and is depicted in FIG. 2. As the hydraulic diagram of this emergency device shows in FIG. 2, a pump 22 is driven by the internal combustion engine 1 or the pump wheel 5 and feeds a pressurizing medium from a lubricant reservoir 20, via a filter 21, into a line 23. This line 23 contains in a first pressure reduction valve 24, in a branched area 23A, and a second pressure reduction valve 25, in a branched area 23B, as well as a branching line 23C, from which, in turn, a branch 23D leads to a primary valve 38, a branch 23E to a setting space 42 of the secondary disk S2 and a secondary valve 39 in a branch 23F. The pressure level of the line 23, for the branches 23A through 23F, is adjusted through the secondary valve 39, which is designed as a pressure control valve. The first pressure reduction valve 24 establishes a constant pressure, e.g., of 6 bar, in the line 26. The second pressure reduction valve 25 also establishes a constant pressure in the line 32 and its branch 32A. A first pressure control valve 27 and a second pressure control valve 28 are connected to the line 26, wherein the pressure in the line 29 and/or 33 can be increased or reduced, in a linear fashion, depending upon the current values adjusted by the electronic control device 15 via these electromagnetic pressure control valves 27, 28. A first emergency valve 30 and a second emergency valve 31 are connected to the line 29 and/or its branches 29A and 29B, wherein the first pressure control valve 27 has a pre-controlling effect, via the branch 29A and/or the line 29, on the emergency valves 30, 31. The first emergency valve 30 is connected, via lines 34, 35, with the primary valve 38 which is a pre-controlled pressure reduction valve. The second emergency valve 31 is connected, via lines 36, 37, with the secondary valve 39 which is a pressure control valve for the secondary side with the lines 23 and/or 23A through 23F. In case the pressure level in the line 23 is too high, the secondary valve 39 lowers the pressure level by feeding additional pressurizing medium, via the line 40, to other components of the continuously variable automatic transmission. The primary valve 38 adjusts the pressure level of the setting space 41 of the primary disk S1, via the line 43.

FIG. 2 depicts the emergency operating mode in which the pressure control valves 27, 28 are currentless, which causes a reduced pressure level, e.g., of 0.4 bar, to develop in the line 29 and/or 33 compared to the line 26. Each spring of the two emergency valves 30, 31 is designed in such a way that the spring force is larger than the force of this reduced pressure. In this way, the two emergency valves 30, 31, which each can assume a first position A and a second position B, are biased into position A. In position A, the lines 29B and 33 are closed, which creates a valve opening for the lines 32 and 32A with the lines 34, 36 and applies the constant pressure level of the second pressure reduction valve 25, as a pre-control pressure, to the primary valve 38 and the secondary valve 39. The primary valve 38 and the secondary valve 39 allow a constant pressure ratio to be established in the setting spaces 41 and/or 42 of the primary disk S1 and secondary disk S2.

During normal operation, the two emergency valves 30, 31 are in position B wherein the lines 34 and/or 36 are venting into the tank and a valve opening is created from the line 29B with the line 35 as well as a valve opening from the line 33 with the line 37. In this way, the pressure value set by the first pressure control valve 27 has a pre-control effect on the primary valve 38 and/or the pressure value set by the second pressure control valve 28 has a pre-control effect on the secondary valve 39. While the first pressure control valve 27 adjusts the gear ratio of the variable speed gear 6, the second pressure control valve 28 adjusts the applied pressure of the secondary disk S2.

FIG. 3 through FIG. 5 show a device, for executing the method pursuant to the invention, which has a valve 44 that is arranged in a pressure feed line 45 for the clutch arrangement of the forward/reverse driving unit 9. This valve 44 is designed in such a way that in the event of failure of the electronic control unit and/or of the electronic control device 15, it interrupts the frictional connection between the internal combustion engine 1 and the continuously variable automatic transmission 3 and re-establishes the frictional connection when restarting the internal combustion engine 1 during failure of the electronic control device 15 in order to enable an emergency operating mode, e.g., via the emergency device pursuant to FIG. 2.

Of course, the invented device in the special embodiment and hydraulic connection of the valve 44 is also suitable for other emergency devices, for example, such with only one emergency valve.

The valve 44, which serves the purpose of interrupting the frictional connection in the present embodiment, is arranged in the pressure supply line 45 to the clutch arrangement of the forward/reverse driving device 9 in such a way that in the event of failure of the electronic control unit 15, it is switched, via an emergency program pressure, into a position that interrupts the pressurizing medium flow to the clutch arrangement and is switched into a position that releases the pressurizing medium flow to the clutch arrangement when re-starting the internal combustion engine 1 during failure of the electronic control device 15.

From a design point of view, the valve 44 is a two-step valve with a first valve stem 46 and a second valve stem 47, wherein the task of the first valve stem 46 consists of assuming a position that releases or blocks the pressurizing medium supply line 45 to the clutch arrangement, while the second valve stem 47, whose working space 48 is connected with the working space 50 of the first valve stem 46 via a line 49, clearly establishes the shifting position of the first valve stem 46.

In the embodiment shown in FIG. 3 through FIG. 5, the first valve stem 46 is designed with a first piston section 51 and a second piston section 53, which is separated from the first one by an area 52 of smaller diameter, wherein an active area 51A of the first piston section 51, which faces away from the second piston section 53, acting against the force of a spring 54 limits the pressurizing medium feed line 45 to the clutch arrangement of the forward/reverse driving unit 9. In the working space 48 of the first valve stem, the second piston section 53 limits a chamber 48A with a connection 55 for the emergency program pressure PNOT through an effective surface 53A, which is facing away from the first piston section 51 has a step design. In the open position of the pressurizing medium line 45, the working space 50 of the second valve stem 47 joins, via the line 49, with a gap 48B between its first and second piston sections of the first lye stem 46.

The second valve stem 47 is designed with a first piston section 56 and a second piston section 58, which is separated from the first one through a smaller diameter area 62, wherein an active area 56A, which faces away from the second piston section 58, of the first piston section 56 acting against the force of a spring 57 limits a chamber 50A into which the connection 65 for the emergency program pressure PNOT and the line 49 to the working space 48 of the first valve stem 46 join which, however, can both be blocked by the first piston section 56. In the working space 50 of the second valve stem 47, a smaller effective surface 58A, which is facing away from the first piston section 56, limits a chamber 50B with a connection 59 for the main pressure PHD and a magnetic device 60, which is activated in the emergency program and, in the present embodiment, is designed as a magnetic switch. A connection 61, for a pressure control pressure PEDS, joins into a gap 500 between the piston sections 56, 58.

The different positions which the valve 44 assumes depends upon the emergency program pressure PNT, the pressure PKV in the pressure feed line 45 to a forward clutch of the forward/reverse driving unit 9, the main pressure PHD and the pressure control pressure PEDS, are explained in more detail in the following.

FIG. 3 shows the valve 44 during normal driving operation in which the first valve stem 46 assumes a first position POSI, in which it is switched against the pressure PKV in the pressure feed line 45 to the forward driving clutch and the spring elasticity of the spring 54 into its position that releases the pressure feed line 45. Meanwhile, the second valve stem 47 assumes a first position POSIII in which it blocks the connection 58 for the emergency program pressure PNOT and the line 49 to the working area 48 of the first valve stem 46 when fed with the main pressure PDH and the pressure control pressure PEDS.

In this state, the clutch pressure PKV is applied to the forward/reverse driving unit, and the frictional connection from the internal combustion engine 1 to the variable speed gear V of the continuously variable automatic transmission 3 prevails.

The position of the valve 44, shown in FIG. 4, is the one it assumes in the event of failure of the electronic control unit 15. In this case, an emergency program pressure PNOT, e.g., of 6 bar, prevails which switches the first valve stem 46 into a second position POSII in which it is shifted with its first piston section 51 against the clutch pressure PKV in the pressure feed line 45 and against the force of the spring 54 so that, with its first piston section 51, it blocks the pressure feed line 45 to the forward/reverse driving unit 9. At the same time, the first valve stem 46 blocks, via its second piston section 53, the connection of the line 49 which leads to the working area 50 of the second valve stem 47. In the event of failure of the electronic control device 15, the second valve stem 47 remains in its first position POSIII as long as the main pressure PHD is applied to it, i.e., as long as the internal combustion engine 1 is running and the pressure supply is maintained. With an interruption in the pressure feed line 45, the frictional connection between the internal combustion engine 1 and the variable speed gear V is separated in the state shown in FIG. 3.

In this non-frictionally engaged state, the gear ratio in the variable speed gear V can be adjusted in such a way that with a subsequent new start of the internal combustion engine 1 and a continuous failure of the electronic control device 15, a gear ratio INOT is established which enables sufficient power to start moving the vehicle and a maximum vehicle speed of at least 100 km/h. It is beneficial when the gear ratio is within the range of 1.0 to 1.6. In the present example, a gear ratio INOT in the range of 1.3 to 1.6 has been set.

FIG. 5 depicts a state of starting to move the vehicle in the emergency program. When the internal combustion engine 1 is shut off, the main pressure PDH drops to a value approaching zero. The pressure control pressure PEDS, that is applied to the second valve stem 47, also decreases. The second valve stem 47 is attracted by the force of the magnetic switch 60, activated by the emergency program, which causes the valve stem to assume a second position POSIV, in which its first piston section 56 opens the connection 58 for the emergency program pressure PNOT and the connection to the line 49 which leads to the working area 48 of the first valve stem 46. In this way, the pressurizing medium, at an emergency program pressure, reaches the gap 48B of the first valve stem 46, via the line 49, and pushes it—via an effective area 56B that is larger than the effective area 53A, to which also the emergency program pressure is applied and which faces away from the gap 48B and the first piston section 51—into its first position POSI, in which the first valve stem 46 opens the pressurizing medium flow of the clutch pressure PKV in the pressure feed line 45.

The retaining force, with which the second valve stem 47 is held in its second position POSIV, is specified by the magnetic switch 60.

In this way, the frictional connection between the internal combustion engine and the variable speed gear V is re-established via the clutch pressure PKV for the forward clutch of the forward/reverse driving unit 9.

During normal driving operation or also upon leaving the emergency program, the second valve stem 47 can be again separated from the magnetic switch 60, via the main pressure PDH, and the pressure control pressure PEDS like a "hydraulic reset" and be shifted into its first position POSIII.

Reference Numerals

1 Drive Assembly, Internal Combustion Engine
2 Drive Shaft
3 Continuously Variable Automatic Transmission
4 Hydrodynamic Converter with Bridging Clutch
5 Pump Wheel
6 Turbine Wheel
7 Stator
8 Transmission Input Shaft
9 Forward/Backward Driving Unit
10 First Taper Disk Set
11 Belt-Wrap Device
12 Second Taper Disk Set
13 Driven Shaft
14 Hydraulic Control Device
15 Electronic Control Unit, Electronic Control Device
16 Micro-Controller
17 Functional Block Control Positioning Elements
18 Diagnosis Functional Block
19 Input Variables
20 Lubricant Reservoir
21 Filter
22 Pump
23 Line
23A Line
23B Line
23C Line
23D Line
23E Line
23F Line
24 First Pressure Reduction Valve
25 Second Pressure Reduction Valve
26 Line
27 First Electromagnetic Pressure Control Valve
28 Second Electromagnetic Pressure Control Valve
29 Line
29A Line
29B Line
30 First Emergency Valve
31 Second Emergency Valve
32 Line
32A Line
33 Line
34 Line
35 Line
36 Line
37 Line
38 Primary Valve
39 Secondary Valve
40 Line
41 Setting Space Primary Disk
42 Setting Space Secondary Disk
43 Line
44 Valve
45 Pressure Feed Line
46 First Valve Stem
47 Second Valve Stem 48 Working Area of the First Valve Stem
48A Chamber of the Working Area of the First Valve Stem
48B Gap
49 Line
50 Working Area of the Second Valve Stem
50A Chamber of the Working Area of the Second Valve Stem
50B Chamber of the Working Area of the Second Valve Stem
50C Chamber in the Working Area of the Second Valve Stem
51 First Piston Section of the First Valve Stem
51A Effective Area
52 Area of the First Valve Stem
53 Second Piston Section of the First Valve Stem
53A Effective Area
54 Spring
55 Connection for Emergency Program Pressure
56 First Piston Section of the Second Valve Stem
57 Spring
58 Second Piston Section of the Second Valve Stem
59 Connection for Main Pressure
60 Magnetic Device, Magnetic Switch
61 Connection/Pressure Control Pressure

| | |
|---|---|
| PEDS | Pressure Control Pressure |
| PDH | Main Pressure |
| PKV | Pressure supplied to the Forward/Backward Driving Device |
| PNOT | Emergency Program Pressure |
| POSI | First Position of the Valve and the First Valve Stem |
| POSII | Second Position of the Valve and the First Valve Stem |
| POSIII | First Position of the Second Valve Stem |
| POSIV | Second Position of the Second Valve Stem |
| S1 | Primary Disk |
| S2 | Secondary Disk |
| V | Variable Speed Gear |

What is claimed is:

1. A method for controlling a drive train of a motor vehicle having a drive assembly (1) and a continuously variable automatic transmission (3) with a variable speed gear (V), the method comprising the steps of:
   providing an electronic control unit (15) and an emergency device for controlling at least the continuously variable automatic transmission (3);
   in an event of failure of the electronic control unit (15), activating the emergency device;
   in the event of failure of the electronic control unit (15), interrupting a frictional connection between the drive assembly (1) and the continuously variable automatic transmission (3) before the emergency driving mode is made available through the emergency device and re-establishing the frictional connection by a constant pressure/force ratio in the variable speed gear (V);
   providing a valve (44) for interrupting the frictional connection between the drive assembly (1) and the continuously variable automatic transmission (3), and arranging the valve (44) in a pressure feed line (45) to a clutch arrangement of a forward/reverse driving unit (9) which can be switched, via an emergency program pressure (PNOT), to a position that interrupts the pressurizing medium flow to the clutch arrangement; and
   actuating the valve (44) dependent upon the emergency program pressure (PNOT), a pressure (PKV) in the pressure feed line (45) to the clutch arrangement of the forward/reverse driving unit (9), a main pressure (PDH) and a pressure control pressure (PEDS).

2. The method according to claim 1, wherein the frictional connection between the drive assembly (1) and the continuously variable automatic transmission (3) is re-established, in the event of a failed electronic control unit (15), after re-starting the drive assembly (1).

3. The method according to claim 1, further comprising the step of re-establishing the frictional connection, after re-starting the drive assembly (1), at a gear ratio (INOT) which is predefined so as to provide sufficient power for starting the vehicle and provide a maximum vehicle speed of at least 100 km/h, and setting a gear ratio in a range of about 1.0 to 1.6, for the emergency operating mode.

4. The method according to claim 1, further comprising the step of switching the valve (44), which is arranged in the pressure feed line (45) to the clutch arrangement of the forward/reverse driving unit (9), via an emergency program pressure (PNOT) and a magnetic device (60) which is activated, in the event of failure of the electronic control unit (15), into a position that opens the pressurizing medium flow to the clutch arrangement and acts against a main pressure force so as to re-establish the frictional connection after re-starting the drive assembly (1).

5. A drive train of a motor vehicle having a drive assembly (1), a continuously variable automatic transmission (3) with a variable speed gear (V), an electronic control unit (15) for controlling at least the continuously variable automatic transmission (3), and an emergency control device which is activated in the event of failure of the electronic control unit (15),
   a clutch arrangement of a forward/backward driving unit (9) of the continuously variable automatic transmission (9) has a pressure feed line (45), and a valve (44) is located in the pressure feed line (45) and the valve (44) is switched, via an emergency program pressure (PNOT), into a position that interrupts a pressurizing medium flow to the clutch arrangement, in the event of failure of the electronic control unit (15), so as to interrupt a frictional connection between the drive assembly (1) and the continuously variable automatic transmission (3); and
   wherein actuation of the valve (44) is dependent upon the emergency program pressure (PNOT), a pressure (PKV) in the pressure feed line (45) to the clutch arrangement of the forward/reverse driving unit (9), a main pressure (PDH) and a pressure control pressure (PEDS).

6. The device according to claim 5, wherein the valve (44) is switched into a position, in the event of failure of the electronic control unit (15), that opens the pressurizing medium flow to the clutch arrangement when re-starting the drive assembly (1).

7. The device according to claim 5, wherein the valve (44) includes a first valve stem (46) and a second valve stem (47), the first valve stem (46) assumes a position that one of opens and blocks the pressure feed line (45) to the clutch arrangement and the second valve stem (47) having a second working area (50) connected with a first working area (48) of the first valve stem (46) via a line (49), establishes a switching position of the first valve stem (46).

8. The device according to claim 7, wherein the first valve stem (46) has a first piston section (51) and a second piston section (53), the second piston section (53) is separated from the first piston section (51) a smaller diameter area (52), an effective area (51A) of the first piston section (51), facing away from the second piston section (53), limits the pressure feed line (45) to the clutch arrangement while acting against a spring (54), and a stepped effective surface (53A), which faces away from the first piston section (51) of the second piston section (53), limits a chamber (48A) with a connection (55) for the emergency program pressure (PNOT) in the working area (48) of the first valve stem (46), and when the first valve stem (46) assumes a position that opens the pressure feed line (45), to the working area (50) of the second valve stem (47) joins, via the line (49), with a gap (48B) between these first and second piston sections.

9. The device according to claim 7, wherein the second valve stem (47) has a first piston section (56) and a second piston section (58), the second piston section (58) is separated from the first piston section (56) by a smaller diameter area (57), an effective area (56A) of the first piston section (56), facing away from the second piston section (58), while acting against a spring (57) limits a chamber (50A) into which a connection (58) for the emergency program pressure (PNOT), and the line (49) to the working area (48) of the first valve stem (46) join, which both can be blocked by the first piston section (56); a smaller effective area (58A) of the second piston section (58), which facing away from the first piston section (56), in the working area (50) of the second valve stem (47) limits a chamber (50B) with a connection (59) for the main pressure (PHD), a magnetic device (60) is activated in the emergency program; and a connection (61) for the pressure control pressure (PEDS) joins into a gap (50C).

10. The device according to claim 7, wherein the first valve stem (46) assumes a first position (POSI), during the normal operating mode, in which the first valve stem (46) is switched to a mode that releases the pressure feed line (45) to the clutch arrangement against the pressure (PKV) in the pressure feed line (45) to the clutch arrangement and against spring elasticity, and the second valve stem (47) assumes a first position (POSIII) in which the second valve stem (47) blocks the connection (58) for the emergency program pressure (PNOT) and the line (49) to the working area (4) of the first valve stem (48) when the main pressure (PHD) and the pressure control pressure (PEDS) are applied.

11. The device according to claim 7, wherein the first valve stem (46) is switched, via the emergency program pressure (PNOT), to a second position (POSIII) in the event of failure of the electronic control unit (15) in which the first valve stem (46) blocks, via its first piston section (51), the pressure feed line (45) to the clutch arrangement and, via the second piston section (53), the connection to the line (49) that leads to the working area (50) of the second valve stem (47), and the second valve stem (47) remains in its first position (POSIII) as long as the main pressure (PHD) is applied to the second valve stem (47).

12. The device according to claim 7, wherein, in the event of failure of the electronic control unit (15), and when re-starting the drive assembly (1), the first valve stem (46) is switched into its first position (POSI) in which the first piston section (51) opens the pressure feed line (45) to the clutch arrangement and the connection to the line (49) that leads to the working area (50) of the second valve stem (47), while the second valve stem (47) is switched, via the magnetic device (60), into a second position (POSIV) in which the first piston section (56) opens the connection (58) for the emergency program pressure (PNOT) and the connection of the line (49) that leads to the working area (48) of the first valve stem (46).

13. The device according to claim 5, wherein the emergency driving device for the variable speed gear (V) contains a first taper disk set (10), on a drive shaft, and a second taper disk set (12), on a driven shaft (13), and the first taper disk set (10) is connected with the second taper disk set (12) by a belt-wrap device (11), the first taper disk set (10) comprises an axially fixed taper disk and an axially displacable primary disk (S1) with a setting area (41) and the second taper disk set (12) comprises an axially fixed taper disk and an axially displacable secondary disk (S2) with a setting area (42), a constant pressure/force ratio between the primary disk (S1) and the secondary disk (S2) is adjusted by positioning elements, and a pressure level of the setting area (42) of the secondary disk (S2) is constant.

14. The device according to claim 13, wherein the positioning elements are a primary valve (38) and a secondary valve (39) which are pre-controlled via a first and a second emergency valve (30, 31).

15. The device according to claim 14, wherein an electromagnetic pressure control valve (27) has a pre-controlling effect on the first and second emergency valves (30, 31).

16. The device according to claim 13, wherein a pump (22) communicates (lines 23A, 23B) with a first and a second pressure reduction valve (24, 25), a first and second electromagnetic pressure control valve (27, 28) are connected (line 26) with the first pressure control valve (24), the first electromagnetic pressure control valve (27) is connected (lines 29, 29A, 29B) with a first and second emergency valve (30, 31), the first emergency valve (30) is connected (lines 34 and 35) with a primary valve (38), the second emergency valve (31) is connected (lines 36 and 37) with a secondary valve (39), the primary valve (38) as well as the secondary valve (39) are connected (lines 23, 23C, 23D, 23F) with the pump (22), so that a pressure level for the setting area (42) of the secondary disk (S2) is determined via the secondary valve (39), the primary valve (38) determines the pressure level of the setting area (41) of the primary disk (S1), the second pressure reduction valve (25) is connected (lines 32 and 32A) with the two emergency valves (30, 31), the switching positions of the first and second emergency valve (30, 31) are determined by the first electromagnetic pressure control valve (27) so that in a first position (B) of the two emergency valves (30, 31) the first pressure control valve (27) has a pre-controlling effect on the primary valve (38) and the second pressure control valve (28) has a pre-controlling effect on the secondary valve (39), and in second position (A) of the two emergency valves (30, 31) the pressure level of the second pressure reduction valve (25) has a pre-controlling effect both on the primary valve (38) and on the secondary valve (39).

* * * * *